Dec. 28, 1937.                    J. M. MASON                    2,103,968
                                 STARTING GATE
                    Filed April 9, 1936          3 Sheets-Sheet 1
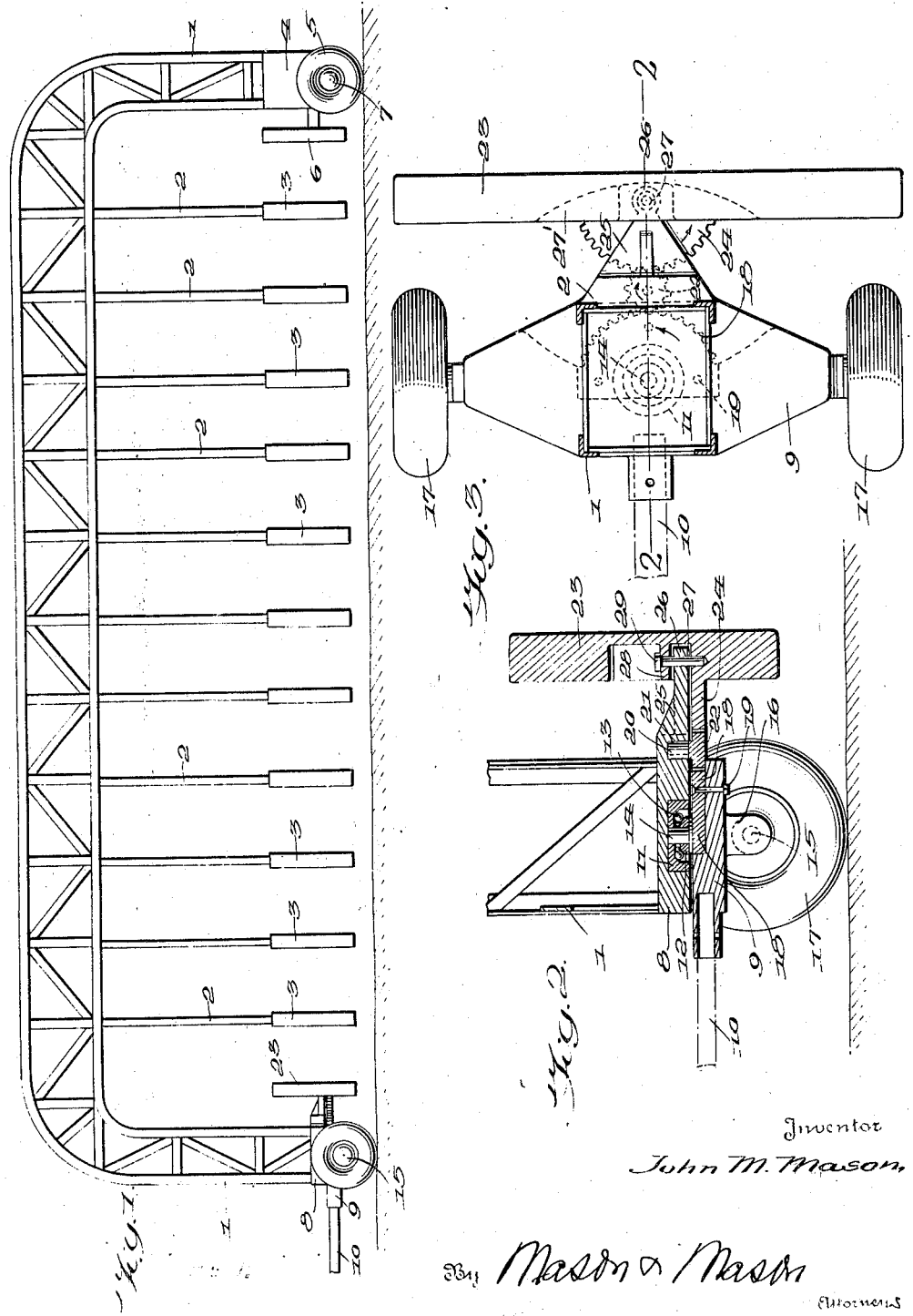
Inventor
John M. Mason,
By Mason & Mason
Attorneys Dec. 28, 1937.　　　J. M. MASON　　　2,103,968
STARTING GATE
Filed April 9, 1936　　　3 Sheets-Sheet 2
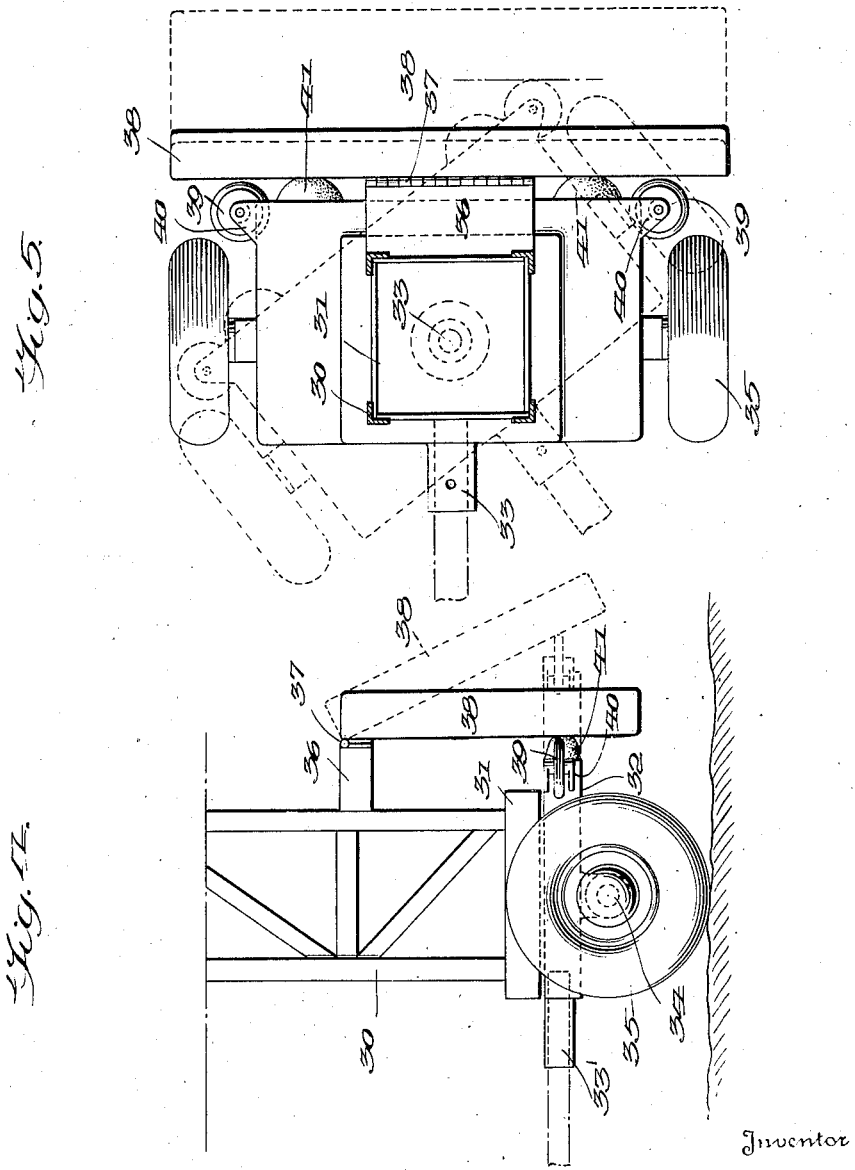
Inventor
John M. Mason,
By Mason & Mason
Attorneys

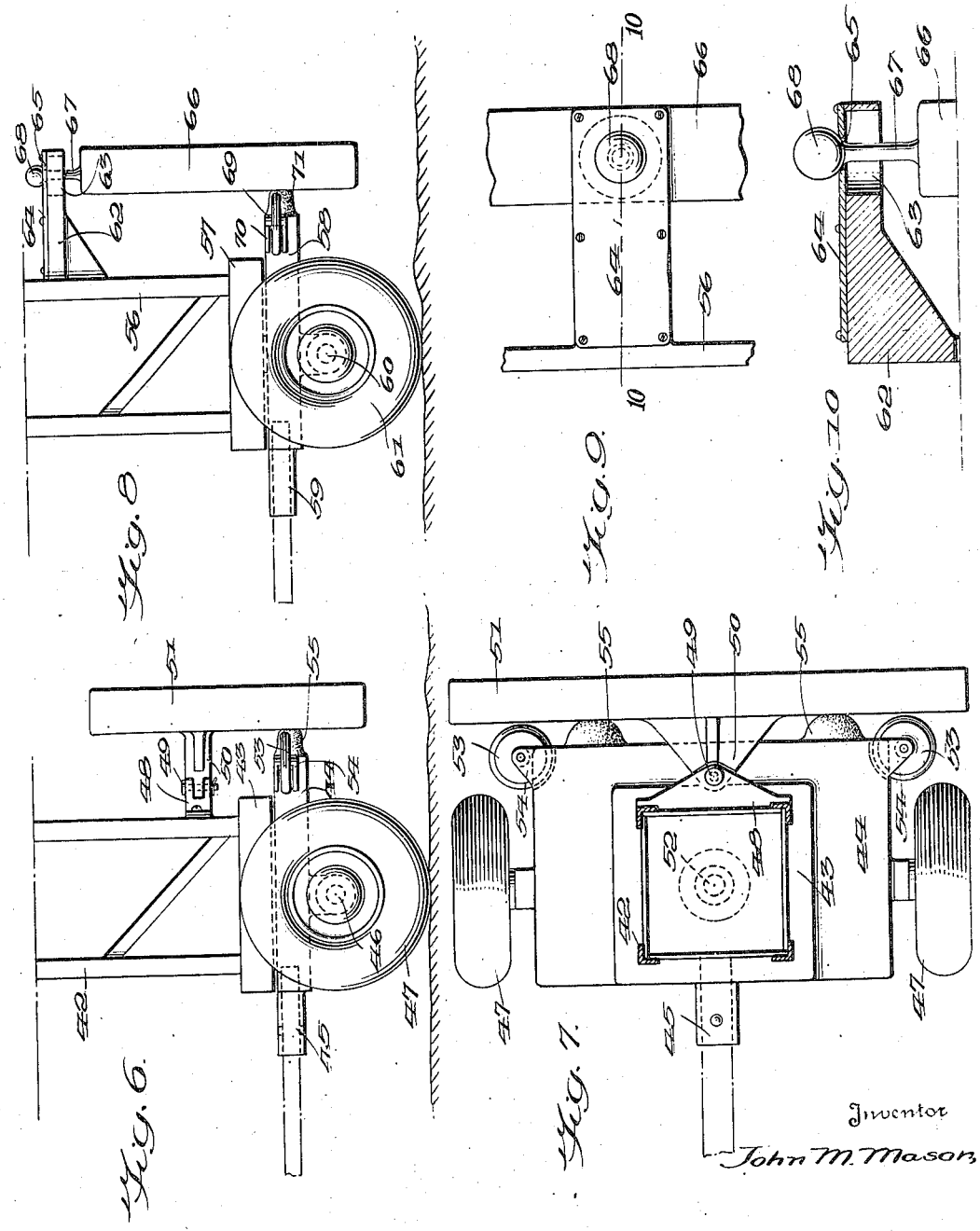

Patented Dec. 28, 1937

2,103,968

UNITED STATES PATENT OFFICE 2,103,968

STARTING GATE

John M. Mason, Washington, D. C.

Application April 9, 1936, Serial No. 73,526

20 Claims. (Cl. 119—15.5)

The present invention concerns itself with a portable starting gate of the type used at race tracks to facilitate the starting of horses on the track, or to be used in the training of race horses.

One of the objects of the invention is to provide a device of this type, which may be readily moved onto or off the track, at the start of the race, the starting gate described herein embodying mechanism whereby the front or rear wheels and axles may have a maximum turning movement, thus facilitating short turns.

Another object of this invention is the provision of a starting gate having means connected to the front truck thereof, for automatically moving one of the partitions or stall members, when making a turn, whereby to avoid interference with the turning of the truck wheels by the partition or stall member as the gate is moved onto or off the track and at other times during the travel of the gate.

Another object is to provide a movable stall member for a starting gate which will permit a ninety degree turning angle for the front truck and front wheels, and where used on the rear of the gate, a greater turning angle for both trucks and their wheels, by automatically moving the movable stall member or members out of the way as the axle or axles describe such turning movement.

Another object is to provide a construction not liable to become damaged or broken by the lunging of a horse during the starting of a race.

Other objects will appear, hereinafter throughout the specification.

In the drawings:

Figure 1 is a side elevation of a starting gate embodying this invention, illustrating the fixed and movable stall members and the supporting overhead framework.

Figure 2 is a vertical sectional view of an embodiment of stall member and truck as shown in Fig. 1, taken at the longitudinal center of the same on the line 2—2 of Fig. 3.

Figure 3 is a plan view partly in section of that embodiment shown in Figs. 1 and 2, taken above the truck.

Figure 4 is a detailed side elevational view of a second embodiment of a movable stall member and truck, and showing in dotted lines the position of the stall member during turning movement of the truck.

Figure 5 is a plan view partly in section, of that embodiment shown in Figure 4, and showing in dotted lines the position of the truck and stall member when negotiating a turn.

Figure 6 is a detailed side elevational view of a third embodiment of stall member and truck.

Figure 7 is a plan view, partly in section, of that embodiment shown in Figure 6.

Figure 8 is a detailed side elevational view of a fourth embodiment of stall member and truck.

Figure 9 is a plan view of the stall supporting means shown in Figure 8.

Figure 10 is a vertical sectional view of the stall member supporting means shown in Figures 8 and 9, taken at the longitudinal center of the truck on the line 10—10 of Fig. 9.

Starting gates for race tracks, extend when in position for the start of a race, substantially entirely across the width of the track and are, because of their length difficult to maneuver, particularly where turning movements are involved. A wide wheel base for the structure is necessary in order to guard against a tendency of the starting gate to topple over on its side when traveling over uneven ground. Such tendency is due to the overhead structure which supports the spaced stall members, between which the horses are led preliminary to the start of a race. Such overhead stucture makes for a high center of gravity. As soon as the race horses have started away from the starting gate, it is imperative to move the gate off the track in the shortest possible time. Due to the unwieldiness of the ordinary starting gate, necessitated by its inability to make short turns and its great length and extensive width, difficulties have arisen in getting the gate off the track quickly, after the race has started.

One manner to insure a short turn for the gate is to provide a fifth-wheel construction for the front and/or sometimes the rear axle upon which the ground wheels are mounted. Such fifth-wheel includes an axle and lower truck, or supporting structure, pivotally connected to the upper framework, or supported structure, at the center of the axle. In order to reduce the length of the gate as much as possible while providing enough stall members to accommodate the maximum number of horses which may be simultaneously started in a race, the end stall members have been located quite close to the front and rear axles. However, with this construction, when one or both axles are rotated about their centers to make a short turn, the ground wheels and other parts of the supporting structure which turn with the axle come into engagement with the end stall member nearest the swinging axle, with the result that the turning movement of the axle is thus quite limited. When it is appreciated that because of the great length of these starting gate structures it is very often necessary to make a short turn to enable the structure to negotiate a turn in the road such as when the gate is being moved from one track to another, or when being moved onto or off the racing course, it will be seen that such gates must provide means whereby a maximum turning movement of the supporting wheels is permitted.

In the patent to Bahr, 1,992,802 of February 26, 1935, there is shown a starting gate, with one end of the gate supported by a fifth-wheel construction, and the end stall member adjacent the fifth wheel is pivotally mounted, so as to be swung up out of the way into an upper position, and latched in such position to allow maximum pivotal movement of the wheels and axle. The operation above referred to requires quick action on the part of the gate attendants, for after the race has started the gate must at once be removed from the track. In the event one of the attendants overlooks the fact that the pivoted stall member has not been latched or locked at the limit of its upper position, and an attempt is made to turn the front axle in getting the gate off the track, or in a case where the horses attached to said gate for pulling the same get out of hand and turn the axle and wheels before the stall member has been latched in its upper position, one of the wheels or other members movable about the same axis as the wheels may become jammed or wedged against the end stall member. The result may be an injury to these parts, and in some instances such injury will prevent the removal of the gate from the track before the horses in the race come around the track and into the stretch where the gate is located which will require the re-running of the race, and the consequent calling off of all bets made thereon.

The device of the present invention seeks to overcome all these difficulties by the provision of means mounted on the pivoted truck for positively moving the adjacent end stall member with every movement of the pivoted axle, to thereby insure the movement of the stall member out of the way of the pivoted axle as it is swung about its pivotal center when making a turn. Said means thus automatically moves the end stall member whenever the axle is turned about its supporting center, but not otherwise, so that, as long as the axle is transversely arranged with respect to the longitudinal center of the starting gate, whether the gate is being moved over the ground or remains in a stationary position the end stall member remains in position for use when starting a race, i. e., in a vertical plane, transverse to the longitudinal center of the gate.

Referring to the drawings, and particularly Figs. 1, 2, and 3 thereof, I indicates the overhead framework, which may be of truss construction and of the shape, generally, of an inverted U. Supported rigidly by the horizontal portion of the inverted U-shaped framework are a plurality of spaced supports 2 for the stall members 3, which members are padded on their sides in the ordinary manner to prevent injury to the horses that stand between the pairs of stall members at the start of the race.

The rear end of the gate is indicated generally by the numeral 4, which may comprise a truck having a pair of wheels, indicated by numeral 5. Additionally supported by the truck 4 is an end stall member 6. Both the end stall member 6 and the axle 7 which mounts the wheels 5 may be rigidly mounted on the truck. However, it is within the scope of this invention to mount the axle 7 and end stall member 6 in the same manner as the front axle and front stall member now to be described, whereby these parts may function in a manner similar to the front stall and axle, there being additionally in such case, a steering wheel or other steering means provided to cause said rear axle and stall member driven thereby to turn in either direction.

The platform 8 comprising the upper truck member of the forward truck is rigidly attached to the forward leg of the overhead framework, and is supported by the lower truck member 9, which is provided with a tongue 10 to which draft horses may be hitched for pulling the gate onto or off the field, or the tongue may be dispensed with and any suitable tractor hitch substituted therefore.

The fifth-wheel construction shown includes upper and lower raceways 11 and 12, affixed to the upper and lower truck members 8 and 9 respectively. The upper and lower raceways are provided with apertures which retain in position the shaft or pin 14, there being suitable antifriction means such as the balls 13, mounted to roll on the raceways. These parts are located midway of the axle 15 that supports the entire end of the structure. The axle may be attached to the lower truck member by means of suitable supporting members 16.

The axle 15 is entirely supported by a pair of ground engaging wheels 17. Mounted within a recess of the lower truck member is a gear segment 18, which is rigidly affixed thereto by suitable bolts 19. The pin 14 is rigidly fastened in any suitable manner to the upper surface of the gear segment, in the position shown in Figures 2 and 3, to which reference may now be had.

Mounted on a shaft 20 located in a bearing 21 of the upper truck member, is a pinion gear 22 in meshed engagement with gear segment 18. The movable end stall member 23 is provided with a gear segment 24 which meshes with the pinion gear 22.

Any suitable means may be provided to support the stall member for pivotal movement. As shown in the present instance this support consists of an extension 25 integral with or attached to the upper truck member 8, the end 26 thereof having an aperture 27. The end projects into an aperture 27', arc shaped in curvature within one of the sides of the stall member 23. Extending transversely across the aperture 27' is a web 28, having an aperture in alignment with a second aperture for the reception of a pin 29 which supports the stall member for pivotal movement about the pin as a center.

In the form shown the gear segments 18 and 24 are illustrated as having the same gear ratio relative to the intermediate gear. This gear ratio may be varied without departing from the spirit of the invention.

It is of course within the scope of the present invention to make the gear segments 18 and 24 and/or the pinion gear 22 of larger circumference and to lengthen the extension 25 to thereby space the movable stall member a greater distance from the frame 1 and the upper truck member 8. Such greater spacing of these parts will permit of a larger turning movement of the stall member, lower truck and axle before one end of the stall member would come into contact with the upper truck member and overhead structure. The upper truck member may have the same dimensions as the four posts of the overhead structure except for the extension 25, as shown in Figures 2 and 3.

In Figs. 4 and 5 has been shown another form of the invention, wherein 30 indicates a lower leg of the inverted U frame supporting framework, similar to that shown by Figure 1, which is mounted rigidly on the upper truck member 31. The upper truck member is mounted on the lower truck member 32 so as to allow pivotal movement of the latter about a central pivot post 33 to thereby constitute a fifth-wheel. Turning of the lower truck member is attained by the draft means such as the tongue 33', or a tractor hitch may be substituted therefor. The lower truck is supported by an axle 34 and wheels 35 in a well known manner to permit free turning of these parts about the central pivot post 33.

Mounted on the framework 30 at any suitable height is a support 36 having a hinge thereon indicated by numeral 37 and supported for movement in a plane longitudinal to the gate is a movable stall member 38. Lower truck member 32 has mounted thereon preferably two or more rollers 39 which may be mounted by means of brackets 40 at the corners of the truck member 32, or at any suitable place adjacent the rear edge or the two side edges of said truck. One of these will engage the movable stall member whenever the truck is turned from the position indicated in full lines in Figures 4 and 5, to any other position about a 90 degree angle or a greater angle, when making a turn, to thereby permit the starting gate to have a short turning radius.

It will be appreciated that the right hand side of the stall member 38 as viewed in Figures 4 and 5 may be padded in the usual manner. The left hand side, or that side on which the rollers 39 roll when the parts are moving to the position indicated by dotted lines in these figures, is a flat, hard surface of wood or other material. A wear plate, not shown, of metal or other material may be affixed to that part of the side of the stall member upon which the rollers run to thereby form a track or wear surface. Buffers 41 of rubber or other material mounted on truck member 32 receive any shocks caused by the lunging of a horse against the stall member when the parts are in the full line position of Figure 4, to thereby prevent injury to the rollers 39 or brackets 40.

Figures 6 and 7 illustrate a form similar to that shown by Figures 4 and 5. In this latest form there is a pivot which permits the movable stall member to turn on a vertical axis instead of the horizontal axis provided in Figures 4 and 5. Numeral 42 indicates a portion of the overhead framework which supports rigid stall members similar to that shown in Figure 1; 43 the upper truck member; 44 the lower truck member; 45 the draft means; 46 the centrally pivoted axle; 47 the ground engaging wheels; 48 the supporting member which may be mounted as shown or mounted on the upper truck member; 49 the vertical pivot; 50 a bracket; 51 the movable stall member, and 52 the pivot pin for the fifth wheel construction including the axle and truck members above recited; 53 rollers mounted as shown, or in any suitable position on the lower truck member; 54 brackets on said truck member for supporting the rollers; and 55 buffers to prevent injury to said rollers or brackets when the parts are in the position shown.

The operation of the parts will be understood by inspection of Figures 6 and 7 wherein it will be seen that as the axle turns from the position shown in either direction about the pivot pin 52 to negotiate a right or left turn of the gate, the rollers push the stall member a similar distance about the vertical pivot 49.

It will be recognized that in the present form the rollers do not roll to any extent if at all upon the face of the movable stall member, as distinguished from the rolling of the similarly shown rollers 39 upon the front surface of the stall, as shown in Figures 4 and 5.

The action of rollers 53 is merely to push the stall member and roll on the stall member only to the extent necessary to overcome the inertia of the stall member or other slight movements necessary to insure a free turning of the stall member. In the present embodiment rollers 53 and their brackets 54, if preferred, may be entirely dispensed with and use made of the buffers 55, (which assist in turning the stall member when the rollers are used). These rubber buffers, or similar stud members of rigid material, may be used alone to cause the turning of the stall member when the vertical pivot is used.

It is to be expressly understood that the distance the movable stall member is spaced from the supporting framework or the truck members, may be of greater extent than that shown to thereby allow for a ninety degree turning movement by changing the dimensions of the parts 42, 43, 44, 48, and 50 when such a large turning radius is desired without departing from the spirit of this invention.

Figures 8, 9 and 10 illustrate another modification, the principal feature not disclosed in the embodiments illustrated by Figures 4, 5, 6, and 7 being the construction of the supporting means for the movable stall member. In these figures, 56 represents a portion of the overhead gate construction which supports the rigid stall members shown by Figure 1; 57 and 58 the rigid and movable truck members, respectively; 59 the draft means; 60 the pivoted axle, which is centrally pivoted as in Figures 4, 5, 6 and 7 (but not here shown); 61, ground engaging wheels; 62 a bracket shown as supported by the overhead structure but which obviously could be supported by the upper truck member 57; 63, an aperture in the bracket member; 64, a supporting plate attached to said bracket having an aperture 65 of smaller dimensions than the aperture 63; 66, the movable stall member; 67, the supporting stem having the head 68 on the end thereof; 69, the rollers supported by brackets 70 mounted on the lower truck member; and 71 one or more buffers.

The parts 67 and 68, which may be centrally affixed between the sides of the stall so as to permit free movement in either direction, allow for universal movement of the stall due to the ball-shaped end 68 and its mounting on the plate 64. The apertures 63 and 65 permit the supporting stem to rotate or to swing in a vertical plane, or to combine such movements to thereby allow the stall member to move away from the lower portion of the overhead gate shown in said figures and to partially turn, as the lower truck turns about its central pivot, during turning movements of the axle, wheels and lower truck member.

The mounting for said stall is such that there exists no chance of the stall member not moving out of the way of the lower truck member as the rollers 69 or buffers 71 engage the same in the negotiating of a turn, as the ball-shaped head provides a universal pivot for the stall member 66. In this construction the rollers and their supporting brackets may be dispensed with, but their use is preferred, as otherwise there would not be the free turning movement of the stall member. During turning movements of the axle, wheels and lower truck member, due to the universal mounting of the stall member, its movements may be said to be a combination of the movements of the stall members 38 and 51 shown in Figures 4 and 6, respectively, inasmuch as pivoting is permitted on both a horizontal and vertical axis.

It is to be understood that the various forms shown and described are for illustrative purposes only, and that the invention is susceptible of such modifications and adaptations as come within the scope of the appended claims.

The term "lower truck member" in the claims is intended to mean any part to which the pivotal axle which supports the ground engaging wheels is mounted, and the term "upper truck member" in the claims is intended to include any means to which the overhead structure is attached or to include a part of the overhead structure itself.

What I claim is:—

1. A portable starting gate including an overhead structure having a plurality of stall members attached thereto, supporting means at each end thereof, at least one of said supporting means comprising an upper truck member attached to said overhead structure, and a lower truck member having an axle and wheels thereon, pivot means forming a pivotal connection between said upper truck member and said lower truck member, axle and wheels, a movable end stall member having a mounting means located above said lower truck member, said lower truck member having a driving gear attached thereto, a driven gear attached to said end stall member, and a pinion gear mounted on said upper truck member and in meshed relation to said driving and driven gears whereby said end stall member is turned by said lower truck member and in the same direction when said lower truck member is turned about its pivot means.

2. A portable starting gate including an overhead structure having a plurality of stall members attached thereto, supporting means at each end thereof, at least one of said supporting means comprising an upper truck member attached to said overhead structure, and a lower truck member having an axle and wheels thereon, pivot means forming a pivotal connection between said truck members, a movable stall member having a mounting means located above said lower truck member, and gear mechanism connected to form a driving connection between said lower truck member and said end stall member whereby said end stall member is moved by said lower truck member, when said lower truck member is turned about its pivot means.

3. A portable starting gate including an overhead structure, a truck supporting one end of said structure comprising an upper truck member rigidly affixed to said structure, and a lower truck member having an axle and a pair of wheels mounted thereon, said last named truck member having a pivotal connection with said upper truck member to allow turning movement of said lower truck member, a support mounted on said overhead structure, a hinge having a vertical axis attached to said support, a movable stall member attached to said hinge, and means mounted on said lower truck member in operative position to engage said stall member and move the same about the vertical axis of said hinge when said lower truck member is turned about its pivotal connection.

4. A portable starting gate including an overhead structure, a truck supporting one end of said structure comprising an upper truck member rigidly affixed to said structure, and a lower truck member having an axle and a pair of wheels mounted thereon, said last named truck member having a pivotal connection with said upper truck member to allow turning movement of said lower truck member, a support mounted on said overhead structure, a hinge having a vertical axis attached to said support, a movable stall member attached to said hinge, and antifriction means mounted on said lower truck member in operative position to engage said stall member and move the same about the vertical axis of said hinge when said lower truck member is turned about its pivotal connection.

5. A portable starting gate including an overhead structure, a truck supporting one end of said structure comprising an upper truck member rigidly affixed to said structure, and a lower truck member having an axle and a pair of wheels mounted thereon, said last named truck member having a pivotal connection with said upper truck member to allow turning movement of said lower truck member, a support mounted on said overhead structure, a hinge having a vertical axis attached to said support, a movable stall member attached to said hinge, and antifriction means mounted on said lower truck member comprising a plurality of rollers in operative position to engage said stall member and move the same about the vertical axis of said hinge when said lower truck member is turned about its pivotal connection.

6. A portable starting gate including the following instrumentalities: an overhead structure, a truck supporting one end of said structure comprising an upper truck member rigidly affixed to said structure, and a lower truck member, said lower truck member having an axle and a pair of wheels mounted thereon, said last named truck member having a pivotal connection with said upper truck member at the center thereof to allow turning movement of said lower truck member, a support mounted on said overhead structure, a movable stall member, a spherical member and stem mounted on said stall member and an aperture in said support seating said spherical member to allow universal movement of said stall member with relation to said support and overhead structure, and antifriction means mounted on said lower truck member comprising a plurality of rollers in operative position to engage said stall member and cause the same to move out of the way of said lower truck member when the same is turned about its pivotal connection.

7. A portable starting gate, including an overhead structure having a plurality of stall members attached thereto, means for supporting the ends of said overhead structure, at least one of said means including an upper and a lower truck member, said lower truck member having an axle and wheels on said axle, pivot means connecting said upper and lower truck members to each other whereby said lower truck member, axle and wheels may turn about said pivot means, a movable end stall member, universal supporting means for said end stall member permitting movement of said end stall member relative to said overhead structure including a support mounted on said overhead structure having an aperture, and a stem attached to said end stall extending through said aperture and a spherical member on the end of said stem seated on said aperture, and means on said lower truck member operative to engage said end stall member and move the same out of the way of said lower truck member when the same is turned about its pivot means.

8. A portable starting gate including an overhead structure having a plurality of stalls attached thereto, means for supporting the ends of said overhead structure, at least one of said means including an upper and a lower truck member, said lower truck member having an axle and wheels on said axle, pivot means connecting said upper and lower truck members to each other whereby said lower truck member, axle and wheel may turn about said pivot means, a movable end stall member, universal supporting means attached to said overhead structure for said end stall member permitting movement of said end stall member relative to said overhead structure, and means on said lower truck member operative to move the said end stall member out of the way of said lower truck member when the same is turned about its pivot means.

9. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a part thereof adjacent to said lower truck member and spaced from the same, and said lower truck member having means projecting therefrom adapted to engage said part and to thereby swing said movable stall member to permit free turning movement of said lower truck member relative to said overhead structure.

10. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a part thereof adjacent to said lower truck member and spaced from the same, and said lower truck member having means spaced from said movable stall member part, and means interposed between said last named means and said movable stall member to permit free turning movement of said lower truck member relative to said overhead structure to cause swinging movement of said movable stall member relative to said overhead structure.

11. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a side thereof adjacent to said lower truck member and spaced from the same, and said lower truck member having means projecting therefrom adapted to engage said side and to thereby move said movable stall member to permit free turning movement of said lower truck member relative to said overhead structure.

12. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a part thereof adjacent to said lower truck member and spaced from the same, said lower truck member having roller means at spaced points thereon projecting therefrom adapted to engage said part and to thereby swing said movable stall member to permit free turning movement of said lower truck member relative to said overhead structure, and buffer means between the roller means adapted to normally maintain the movable stall member part spaced from the roller means.

13. A portable starting gate including an overhead structure, having a plurality of stall members rigidly attached thereto, a stall member pivotally attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a side thereof adjacent to said lower truck member and spaced from the same, and said lower truck member having means projecting therefrom adapted to engage said side and to thereby swing said movable stall member to permit free turning movement of said lower truck member relative to said overhead structure.

14. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a side thereof adjacent to said lower truck member and spaced from and normally parallel to a side of the same, and said lower truck member having anti-friction means projecting therefrom adapted to engage said side of the stall member and to thereby swing said movable stall member to permit free turning movement of said lower truck member relative to said overhead structure, and buffer means extending between said stall member side and said lower truck member side and adapted to prevent contact between said stall member side and said anti-friction means when said sides are in parallel relation with each other.

15. A portable starting gate including an overhead structure, having a plurality of stall members rigidly attached thereto, a stall member having pivotal attaching means connecting the same to one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a part thereof adjacent to said lower truck member and spaced from the same, and said lower truck member having means projecting therefrom adapted to engage said part and to thereby swing said movable stall member to permit free turning movement of said lower truck member relative to said overhead structure.

16. A portable starting gate including an overhead structure having a plurality of stall members rigidly attached thereto, a stall member having a universal attaching means for connecting said stall member to one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a part thereof adjacent to said lower truck member and spaced from the same, and said lower truck member having means projecting therefrom adapted to engage said part and to thereby swing said movable stall member to permit free turning movement of said lower truck member relative to said overhead structure.

17. A portable starting gate including an overhead structure, having a plurality of stall members rigidly attached thereto, a stall member having means pivotally connecting the same to said overhead structure including a member having a horizontal axis, a truck at each end of the overhead structure, at least one truck comprising an upper truck member attached to said overhead structure, and a lower truck member having an axle and wheels thereon, said lower and upper truck members being pivotally connected to each other whereby said lower member may be swung in a horizontal plane, said movable stall member having a part thereof adjacent to said lower truck and spaced from the same, and said lower truck member having means projecting therefrom adapted to engage said part and to thereby swing said movable stall member to permit free turning movement of said lower truck member relative to said overhead structure.

18. A portable starting gate including an overhead structure, having a plurality of stall members rigidly attached thereto, a stall member having means pivotally connecting the same to said overhead structure including a member having a vertical axis, a truck at each end of the overhead structure, at least one truck comprising an upper truck member attached to said overhead structure, and a lower truck member having an axle and wheels thereon, said lower and upper truck members being pivotally connected to each other whereby said lower member may be swung in a horizontal plane, said movable stall member having a part thereof adjacent to said lower truck and spaced from the same, and said lower truck member having means projecting therefrom adapted to engage said part and to thereby swing said movable stall member to permit free turning movement of said lower truck member relative to said overhead structure.

19. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member having a part thereof adjacent to said lower truck member and spaced from the same, and said lower truck member having a plurality of corners, and roller means projecting from said corners, adapted to engage said part and to thereby swing said movable stall member to permit free turning movement of said lower truck relative to said overhead structure.

20. A portable starting gate including an overhead structure, having a plurality of stall members rigidly attached thereto, a stall member movably attached adjacent one end of said overhead structure, a truck at each end of the overhead structure, at least one truck comprising an upper truck member attached to said overhead structure, and a lower truck member having an axle and wheels thereon, said lower and upper truck members being pivotally connected to each other whereby said lower truck member may be swung in a horizontal plane, said movable stall member being located adjacent to said lower truck member and spaced from the same, and means mounted on one of said spaced apart members and projecting therefrom, and adapted to engage the other spaced apart member to swing the movable stall member to permit free turning movement of said axle and wheels relative to said overhead structure.

JOHN M. MASON.